(12) United States Patent
Meyer et al.

(10) Patent No.: US 7,758,771 B2
(45) Date of Patent: Jul. 20, 2010

(54) PRODUCT FOR TRANSFORMATION OF A TOXIC CORROSIVE OR ENVIRONMENTALLY-NOXIOUS LIQUID PRODUCT INTO A NON-CORROSIVE OR NON-NOXIOUS RESIDUE

(75) Inventors: Marie-Claude Meyer, c/o Prevor International, B.P. 1 - Moulin de Verville, 95760 Valmondois (FR); Laurence Mathieu, Talence (FR); Celine Godard, Cergy le Haut (FR)

(73) Assignee: Marie-Claude Meyer, Valmondois (FR)

( * ) Notice: Subject to any disclaimer, the term of this patent is extended or adjusted under 35 U.S.C. 154(b) by 531 days.

(21) Appl. No.: 11/718,064

(22) PCT Filed: Oct. 20, 2005

(86) PCT No.: PCT/FR2005/002609

§ 371 (c)(1),
(2), (4) Date: Apr. 26, 2007

(87) PCT Pub. No.: WO2006/048521

PCT Pub. Date: May 11, 2006

(65) Prior Publication Data

US 2009/0224202 A1 Sep. 10, 2009

(30) Foreign Application Priority Data

Oct. 29, 2004 (FR) .................................. 04 11602

(51) Int. Cl.
*B01D 59/26* (2006.01)
*B01J 20/22* (2006.01)

(52) U.S. Cl. ..................... 252/190; 252/192; 252/193; 252/194; 502/401; 95/117; 95/126

(58) Field of Classification Search ................. 502/401; 252/190, 192, 193, 194; 95/117, 126

See application file for complete search history.

(56) References Cited

U.S. PATENT DOCUMENTS

| 4,248,597 | A | * | 2/1981 | McNeely | ..................... 116/206 |
| 5,342,543 | A | | 8/1994 | Morris et al. | |
| 5,641,496 | A | | 6/1997 | Van Roekel et al. | |
| 5,766,312 | A | | 6/1998 | Furhmann et al. | |
| 5,846,836 | A | | 12/1998 | Mallow et al. | |
| 6,380,130 | B1 | * | 4/2002 | Meyer et al. | ................. 502/401 |

FOREIGN PATENT DOCUMENTS

EP 0995492 4/2000

OTHER PUBLICATIONS

Database XP002421549.
Database XP002332232.
Patent abstracts of Japan, vol. 007, No. 225 (C-189).

* cited by examiner

*Primary Examiner*—Ling-Siu Choi
*Assistant Examiner*—Monique Peets
(74) *Attorney, Agent, or Firm*—B. Aaron Schulman; Stites & Harbison PLLC

(57) ABSTRACT

The invention relates to a product for transformation of a toxic corrosive or environmentally-noxious product into a non-corrosive or non-noxious residue, comprising at least one amphoteric agent, at least one lipophilic absorbent, at least one hydrophilic absorbent and at least one binary colored indicator, selected from the group of the following mixtures: Nile blue/alizarin red, alizarin yellow/alizarin red, thymolphthalein/methyl red, phenolphthalein/methyl red and tropaeolin OO/thymol blue and optionally an additive selected from the group comprising charge agents, granulation agents, anti-static agents and mixtures thereof.

16 Claims, No Drawings

PRODUCT FOR TRANSFORMATION OF A TOXIC CORROSIVE OR ENVIRONMENTALLY-NOXIOUS LIQUID PRODUCT INTO A NON-CORROSIVE OR NON-NOXIOUS RESIDUE

The present invention relates to an improved product for transforming a corrosive or environmentally noxious toxic liquid product into a non-corrosive or non-noxious residue.

Such products, which are also known as neutralizing products, have been described in patents FR 2 784 589 and EP 995 492. Although highly efficient, they do not make it possible to know whether the dispersed toxic product is completely neutralized. The user thus has a tendency to increase the doses of neutralizing product so as to ensure that the residue can be handled without danger, or alternatively he must take a pH measurement of the residue.

Acid-neutralizing products and base-neutralizing products containing a colored indicator to allow immediate identification of the pH region of the residue are commercially available.

These products are, for example, products sold by the company Haleco under the brand names Neutrabase® and Neutracide®.

However, these products have a specific neutralizing action. They can therefore be used only when the nature of the dispersed product is known. Moreover, for the product Neutrabase®, if the base to be neutralized is too strong, the colored indicator is no longer reliable, or it conserves the basic coloration when the neutralization is complete, or it does not fulfill its function, i.e. no color change is detectable.

The colored indicator function of the product Neutracide® is itself cancelled if the acid to be neutralized is 98% sulfuric acid.

The choice of a pH indicator for relatively simple products such as monofunctional neutralizing products such as Neutracide® or Neutrabase® thus poses a problem.

In addition, it is often difficult to know the nature of the liquid product that has been spread, this product rarely being a pure product, but rather an undefined mixture of environmentally noxious or toxic products.

There is thus a real need for a multifunctional product, i.e. a product that can neutralize both acids and bases, but also oxidizing agents, reducing agents, oils and/or greases, which contains a pH indicator.

The present inventors have found that a multifunctional product, i.e. a product as described in patents FR 2 784 589 and EP 995 492, to which is added a specific mixture of two colored indicators, satisfies all these requirements.

Thus, the present invention relates to a product for transforming a corrosive or environmentally noxious toxic liquid product into a non-corrosive or non-noxious residue, which comprises:
   at least one amphoteric agent chosen such that:
      the pH of the residue obtained is in the range from 5 to 10 and preferably from 5.5 to 9.7,
      the lowest of the acid pKs of the amphoteric agent is in the range from 5 to 10 and preferably from 5.5 to 9.7, and the highest of the basic pKs of the amphoteric agent is chosen in the range from 5 to 10 and preferably from 5 to 8,
      the highest of the basic pKs of the amphoteric agent is lower than the lowest of the acid pKs,
   at least one lipophilic absorbent,
   at least one hydrophilic absorbent, and
   at least one binary colored indicator chosen from the group consisting of the following mixtures: Nil blue/alizarin red, alizarin yellow/alizarin red, thymolphthalein/methyl red, phenolphthalein/methyl red and tropaeolin 00/thymol blue, and
   optionally additives chosen from the group comprising fillers, granulating agents and antistatic agents, and mixtures thereof.

In the present invention, the terms "mixture of two colored indicators", "binary colored indicator" and "colored indicator" will be used indifferently.

The term "liquid product" means any product having a liquid, semiliquid, semipasty or pasty consistency.

According to one advantageous embodiment of the invention, the binary colored indicator is a thymolphthalein/methyl red mixture, preferably a mixture in proportions of 75/25 to 25/75 and preferably 50/50 w/w.

The amount of colored indicator in the product of the invention should be sufficient for the changes in coloration to be very visible. However, it is understood that this amount is limited by the high cost of the coloring agents.

The product in accordance with the invention conveniently comprises from 0.01‰ to 10‰ by weight, preferably from 0.05‰ to 5‰ and even more preferentially from 0.01‰ to 0.5‰ by weight of colored indicator.

According to one advantageous embodiment of the invention, the product comprises at least two amphoteric agents in proportions such that the ratio of the sum of the number of moles of amphoteric agents with an acid pK in the range from 5 to 10 and preferably from 5.5 to 9.7, to the sum of the number of moles of amphoteric agents with a basic pK in the range from 5 to 10 and preferably from 5 to 8, is between 0.1 and 10.

It is recalled that an amphoteric agent is a substance or an ion that can act sometimes as an acid and sometimes as a base. It therefore has at least two dissociation constants (pK), one corresponding to the acid function, the other to the basic function.

More specifically, the product of the invention comprises, besides the colored indicator:
   20% to 60% by weight, preferably 15% to 55% and even more preferentially 10% to 45% by weight of at least one amphoteric agent,
   from 2% to 20% by weight, preferably from 2% to 15% and even more preferentially from 1% to 10% by weight of at least one lipophilic absorbent,
   from 2% to 20% by weight, preferably from 2% to 15% and even more preferentially from 1% to 10% by weight of at least one hydrophilic absorbent,
   from 0 to 5% by weight and preferably from 0.1% to 1% by weight of additives.

In the majority of cases, at least two different amphoteric agents are used, one of which has an acid pK and the other has a basic pK satisfying the requirements indicated above, and which will be referred to for greater convenience hereinbelow as "anti-base amphoteric agent" and "anti-acid amphoteric agent", respectively.

The anti-base amphoteric agent and the anti-acid amphoteric agent are preferably non-conjugated, i.e. one does not give the other via an acid-base reaction.

Anti-base amphoteric agents and anti-acid amphoteric agents that may be used include those described in patents FR 86/11754, FR 86/11754 and FR 86/140 042 in the name of the Applicant. In particular, amphoteric agents chosen from the group comprising: amino acids such as glycine, alanine, serine, glutamine, lysine, alanyl alanine, histidine, L-histidyl-histidine and arginylarginine, and mixtures thereof, sodium bicarbonate, trisodium edetate and disodium citrate may be used.

The product according to the invention may comprise only one amphoteric agent, provided that it has, on the one hand, an acid pK and, on the other hand, a basic pK that satisfy the conditions specified above.

L-Histidylhistidine and arginylarginine may be mentioned as amphoteric agents of this type.

The lipophilic absorbent is an absorbent or super-absorbent product, which is a polymer such as polyisonorbornene, especially the product sold under the name Norsorex APX1 from the company Atochem, or alternatively the Oil Absorber products from the company SNF Floerger, Gamsorb from the company Gamlen Industries S.A., or Rhon'Sec granulate from the company Tolsa France S.A., and mixtures thereof.

The hydrophilic absorbent is chosen from the group comprising absorbents or superabsorbents, especially acrylic polymers such as Norsocryl S35 from the company Elf Atochem and the products sold under the names Aqualic® LAW45 from the company BASF, ASAP 2000 and ASAP 2003 from the company Chemdal Ltd., Favor Z1030 from the company Stockhausen, Drytech 4535R from the company Dow Chemicals, Aquasorb 3005K1 from the company SNF Floerger, and Rhon'Sec granulate from the company Tolsa France S.A., and mixtures thereof.

The product in accordance with the invention is white to pale yellow in color. When the indicator is a thymolphthalein/methyl red mixture, this product becomes blue when it is basic and red when it is acidic.

The product in accordance with the invention is in the form of a powder, granules, tablets or products conditioned in packaging, especially consisting of nonwoven or plastic meshes, of suitable shapes and sizes so as to obtain, for example, plates or rolls that facilitate the use of the product.

For the use of the product according to the invention, the addition of a certain amount of water may occasionally be necessary. This is especially the case when the dispersed liquid is a strong acid. The reason for this is that, since a strong acid contains only very little water, it may prove necessary to add some in order for the neutralization reaction to be complete.

When the product according to the invention is applied to the liquid to be treated, it becomes blue if this liquid is basic and red if it is acidic (when the indicator is thymolphthalein/methyl red), it swells and solidifies, and is then white/yellow. A more or less compact solid residue is thus obtained depending on the nature of the corrosive or noxious toxic liquid spread. This solid residue can then be easily removed, for example using a scraper, a broom or a dust pan without any risk of burns or irritation for the handler.

The invention will now be described in greater detail with the aid of the nonlimiting examples that follow, which are given for purely illustrative purposes.

EXAMPLES

In the examples, the following names are used:

Norsocryl S35: lipophilic absorbent sold by the company Atochem.

Norsorex APX1: hydrophilic absorbent sold by the company Atochem.

Example 1

Use of a Product According to the Invention on Potassium Hydroxide

The product according to the invention is a white powder having the following composition:
 322 g of ammonium chloride,
 393.4 g of boric acid,
 83.3 g of Norsocryl S35,
 83.3 g of Norsorex APX1,
 200 mg of thymolphthalein/methyl red (50/50).

100 ml of potassium hydroxide (KOH) whose concentration is given in Table 1 below are spread onto a work surface. The white powder is then dispersed in the amounts indicated in Table 1, first around the pool and then over its entire surface.

The powder swells, becoming blue, and then solidifies, and the residue formed gradually loses its blue color and becomes off-white.

Checking of the pH with a pH paper shows that the residue is neutralized, and has a pH of between 5.5 and 9.7. It can thus be disposed of without worry.

TABLE 1

| KOH concentration (mol/l) | Amount of powder (g) |
|---|---|
| 18 | 1020 |
| 12 | 685 |
| 6 | 330 |
| 1 | 65 |

Example 2

Determination of the Colored Indicators that May be Used

The following various indicators were chosen as indicator potentially usable for the product of the invention.
Colorant 1: Nil blue/methyl orange (50/50)
Colorant 2: Fluorescein
Colorant 3: Sodium fluorescein/thymolphthalein (50/50)
Colorant 4: Nil blue/alizarin red (50/50)
Colorant 5: Alizarin yellow/alizarin red (56/44)
Colorant 6: Thymolphthalein/tropaeolin 00 (80/20)
Colorant 7: Phenolphthalein/tropaeolin 00 (80/20)
Colorant 8: Phenolphthalein/methyl red (66/33)
Colorant 9: Phenolphthalein/methyl red (80/20)
Colorant 10: Methyl red/alizarin yellow (66/33)
Colorant 11: Thymolphthalein/methyl red (76/24)
Colorant 12: Thymolphthalein/methyl red (50/10)
Colorant 13: Thymolphthalein/methyl red (66/33)
Colorant 14: Thymolphthalein/methyl red (50/50)
Colorant 15: Tropaeolin 00/thymol blue (66/33)
Colorant 16: Tropaeolin 00/thymol blue (50/50)

A first series of colorants alone was tested, and the basic and acidic color changes were checked. The results are given in Table 2 below:

TABLE 2

| Colorant | 1M HCl | Neutral | 1M NaOH | Comments |
|---|---|---|---|---|
| 2 | Yellow | | Yellow-green | Color relatively indistinct for the acidic medium |
| 6 | Deep purple | Yellow | Dark blue-purple | No basic color change, dissolution problem |
| 7 | Purple-red | Orange-yellow | Purple-red | Medium basic color change |
| 8 | Purple-red | Yellow | Purple | Good color changes |
| 10 | Grenadine | Orange | Grenadine | Medium acidic color change |
| 12 | Red | Yellow | Blue | Good color changes |
| 15 | Red/pink | Greenish-yellow | Blue | Good color changes |

As is seen from this table, only colorants 8, 12 and 15 give satisfactory results in terms of color change, when they are used alone.

Products in accordance with the invention were prepared by mixing the colorants indicated in Table 3 below with Product A having the following composition:
- 440.1 g of sodium bicarbonate,
- 393.4 g of glycine,
- 83.3 g of Norsocryl S35,
- 83.3 g of Norsorex APX1, and the basic and acidic color changes were checked. The results are given in Table 3 below.

The amount mentioned in this table corresponds to the amount of colorant in mg/g of Product A.

TABLE 3

| Colorant | Amount | 1M HCl | Neutral | 1M NaOH |
| --- | --- | --- | --- | --- |
| 1 | 50 mg/100 g | Greenish | | Bluish |
| 3 | 40 mg/500 g | Pale yellow | | Bright yellow |
| 4 | 40 mg/80 g | Gray | | Violet-blue |
| 5 | 62 mg/500 g | Yellow | Pink | Violet |
| 9 | 50 mg/50 g | Grenadine | Orange | Grenadine |
| 11 | 3 mg/50 g | Red | Yellow | Blue |
| 12 | 60 mg/50 g | Pink | Yellow | Very dark blue |
| 13 | 24 mg/50 g | Pale pink | Yellow | Blue/green |
| 14 | 20 mg/100 g | Pale pink | Yellowish/yellow | Green/yellow then blue |

It is seen from Table 3 that only colorants 5, 9 and 11-14 may feasibly be used.

The colorants that are the most suitable are colorants 11-14.

The invention claimed is:

1. A product comprising:
   at least one amphoteric agent chosen such that:
      the pH of the residue obtained is in the range from 5 to 10,
      the lowest of the acid pKs of the amphoteric agent is in the range from 5 to 10, and the highest of the basic pKs of the amphoteric agent is chosen in the range from 5 to 10,
      the highest of the basic pKs of the amphoteric agent is lower than the lowest of the acid pKs,
   at least one lipophilic absorbent,
   at least one hydrophilic absorbent, and
   at least one binary colored indicator chosen from the group consisting of the following mixtures: Nil blue/alizarin red, alizarin yellow/alizarin red, thymolphthalein/methyl red, phenolphthalein/methyl red and tropaeolin 00/thymol blue, and
   optionally at least one additive chosen from the group comprising fillers, granulating agents, and antistatic agents, and mixtures thereof.

2. The product as claimed in claim 1, wherein the binary colored indicator is a thymolphthalein/methyl red mixture.

3. The product as claimed in claim 1, wherein the binary indicator is a 75/25 (w/w) to 25/75 (w/w) and preferably 50/50 (w/w) mixture.

4. The product as claimed in claim 1, wherein the product comprises from 0.01‰ to 10‰ by weight of indicator.

5. The product as claimed in claim 1, wherein it comprises at least two amphoteric agents in proportions such that the ratio of the sum of the number of moles of amphoteric agents with an acid pK in the range from 5 to 10, to the sum of the number of moles of amphoteric agents with a basic pK in the range from 5 to 10, is between 0.1 and 10.

6. The product as claimed in claim 1, wherein it comprises, besides the colored indicator:
   20% to 60% by weight of at least one amphoteric agent,
   from 2% to 20% by weight of at least one lipophilic absorbent,
   from 2% to 20% by weight of at least one hydrophilic absorbent, and
   from 0 to 5% by weight of at least one additive.

7. The product as claimed in claim 1, wherein the amphoteric agent is chosen from the group comprising amino acids such as glycine, alanine, serine, glutamine, lysine, alanyl alanine, histidine, L histidylhistidine and arginylarginine, and mixtures thereof, sodium bicarbonate, trisodium edetate and disodium citrate.

8. The product as claimed in claim 1, wherein the lipophilic absorbent is an oil absorber, and the hydrophilic absorbent is an acrylic polymer.

9. The product as claimed in claim 1, wherein it is white to pale yellow in color.

10. The product as claimed in claim 1, wherein it is in the form of a powder, granules, tablets or products conditioned in packaging, especially consisting of nonwoven or plastic meshes, of suitable shapes and sizes so as to obtain, for example, plates or rolls that facilitate the use of the product.

11. The product as claimed in claim 1, wherein the at least one amphoteric agent is chosen such that:
   the pH of the residue obtained is in the range from 5.5 to 9.7,
   the lowest of the acid pKs of the amphoteric agent is in the range 5.5 to 9.7, and
   the highest of the basic pKs of the amphoteric agent is chosen in the range from 5 to 8.

12. The product as claimed in claim 1, further comprising at least one additive chosen from the group comprising fillers, granulating agents, and antistatic agents, and mixtures thereof.

13. The product as claimed in claim 1, wherein the product comprises from 0.05‰ to 5‰ by weight of indicator.

14. The product as claimed in claim 1, wherein the product comprises from 0.01‰ to 0.5‰ by weight of indicator.

15. The product as claimed in claim 1, wherein it comprises, besides the colored indicator:
   from 15% to 55% by weight of at least one amphoteric agent,
   from 2% to 15% by weight of at least one lipophilic absorbent,
   from 2% to 15% by weight of at least one hydrophilic absorbent, and
   from 0.1% to 1% by weight of at least one additive.

16. The product as claimed in claim 1, wherein it comprises, besides the colored indicator:
   from 10% to 45% by weight of at least one amphoteric agent,
   from 1% to 10% by weight of at least one lipophilic absorbent,
   from 1% to 10% by weight of at least one hydrophilic absorbent, and
   from 0.1% to 1% by weight of at least one additive.

* * * * *